(12) United States Patent
Endoh (10) Patent No.: US 10,199,982 B2
(45) Date of Patent: Feb. 5, 2019

(54) MOTOR CONTROL APPARATUS

(71) Applicant: DENSO CORPORATION, Kariya, Aichi-pref. (JP)

(72) Inventor: Go Endoh, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 15/838,125

(22) Filed: Dec. 11, 2017

(65) Prior Publication Data

US 2018/0167019 A1    Jun. 14, 2018

(30) Foreign Application Priority Data

Dec. 12, 2016 (JP) ................... 2016-240197

(51) Int. Cl.
| | |
|---|---|
| *H01M 10/44* | (2006.01) |
| *H02P 31/00* | (2006.01) |
| *B62D 5/04* | (2006.01) |
| *B62D 6/00* | (2006.01) |
| *H02P 29/68* | (2016.01) |

(52) U.S. Cl.
CPC ............ *H02P 31/00* (2013.01); *B62D 5/04* (2013.01); *B62D 6/00* (2013.01); *H02P 29/68* (2016.02)

(58) Field of Classification Search
CPC .......... H02P 27/08; H02P 31/00; H01M 10/48
See application file for complete search history.

(56) References Cited

U.S. PATENT DOCUMENTS

2004/0026161 A1 * 2/2004 Takatsuka ............ B62D 5/0463
180/446
2005/0242760 A1 * 11/2005 Fujita ...................... H02P 23/14
318/434
2009/0066283 A1 * 3/2009 Son .......................... H02P 21/14
318/473
2011/0083467 A1 * 4/2011 Asano ..................... F25B 49/025
62/498
2016/0126877 A1 * 5/2016 Endoh ..................... H02P 29/64
318/400.02

FOREIGN PATENT DOCUMENTS

| JP | 2892899 B2 | 5/1999 |
| JP | 2002-362393 A | 12/2002 |
| JP | 2016-092944 A | 5/2016 |

* cited by examiner

*Primary Examiner* — Bickey Dhakal
*Assistant Examiner* — Charles S Laughlin
(74) *Attorney, Agent, or Firm* — Knobbe, Martens, Olson & Bear, LLP (57) ABSTRACT

A self-holding termination determination section has an overheat protection map that defines a relationship between a current value and a maximum temperature of a protected portion to which a current value is applied, and sets a limit temperature corresponding to a required current value at next start time based on the map. The self-holding termination determination section calculates, as an evaluation temperature, temperature obtained by adding a performance assurance upper limit temperature, which assures output performance of a motor at the next start time, to the sum of temperature rises. In a next time performance determination process, if the evaluation temperature for all protected portions has fallen below the limit temperature, the self-holding termination determination section determines that a performance assurance condition is met, and terminates power self-holding based on at least the fact that the performance assurance condition is met.

5 Claims, 8 Drawing Sheets

MOTOR CONTROL APPARATUS

CROSS-REFERENCE TO RELATED APPLICATION

This application is based on and claims the benefit of priority from earlier Japanese Patent Application No. 2016-240197 filed Dec. 12, 2016, the description of which is incorporated herein by reference.

BACKGROUND

Technical Field

The present disclosure relates to a motor control apparatus that controls electric conduction to a motor.

Related Art

Conventionally, a technique is known in which a motor control apparatus limits current flow based on a temperature rise estimated from a current flowing to a motor, to prevent elements from being overheated. After the electric conduction to the motor stops, control power is kept to continue temperature estimation.

For example, Japanese Patent No. 2892899 discloses a motor control apparatus. If estimated temperature of a motor is high after power supply to the motor is shut off, the motor control apparatus calculates the time period during which power is held (hereinafter, referred to as power holding time) based on the temperature rise of the motor, and continue temperature estimation. Then, after the power holding time is passed, the motor control apparatus shuts off the self-holding power.

In Japanese Patent No. 2892899, the time until when the temperature rise of the motor lowers to be equal to or less than an allowable temperature value is calculated from a heat radiation coefficient or the like of the motor, and the power holding time is set based on the calculated time.

Output performance of the motor required at the next start time includes the amount of electric conduction for generating torque at the initial start time, the time period during which a certain electric conduction pattern can be maintained, and the number of electric conduction patterns that can be repeated. For example, in the case of a drive unit of an assist motor of an electric power steering system, an initial assist rate or the number of stationary steering operations serves as an index value indicating specific performance.

To ensure the above required performance at the next start time, according to the technique of Japanese Patent No. 2892899, an allowable temperature value has to be low, and the holding time has to be long. Hence, dark current increases while the motor is stopped.

SUMMARY

An embodiment provides a motor control apparatus that minimizes power self-holding time after supply of drive power is stopped so as to ensure performance required at the next start time.

As an aspect of the embodiment, a motor control apparatus is provided which includes: a drive circuit that drives a motor; a power supply circuit that has a power self-holding section that holds power for control after supply of drive power to the drive circuit is stopped; a temperature rise estimation section that estimates at least one temperature rise based on a square value of current flowing through the motor, the drive circuit, or the power supply circuit, or a first-order lag response of a time average of an integrated value of the current; a detection temperature acquisition section that acquires a detection temperature of at least one protected portion to be protected from being overheated or of a portion having a correlation regarding temperature with the protected portion; an estimated temperature calculation section that adds the detection temperature to a sum of the at least one temperature rise to calculate estimated temperature of the protected portion; a current limitation calculation section that calculates a current limiting value for limiting a current command value based on the estimated temperature; and a self-holding termination determination section that determines termination of power self-holding.

The temperature rise estimation section continues the estimation of the temperature rise while the powerself-holding section holds power.

The self-holding termination determination section has an overheat protection map that defines a relationship between a current value and a maximum temperature of the protected portion to which the current value is applied, and sets a limit temperature corresponding to a required current value at the next start time based on the overheat protection map.

The self-holding termination determination section calculates, as an evaluation temperature, temperature obtained by adding a performance assurance upper limit temperature, which is an upper limit temperature assuring output performance of the motor at the next start time, to a sum of the at least one temperature rise.

In a next time performance determination process for comparing the evaluation temperature and the limit temperature, if the evaluation temperature for all of the at least one protected portion has fallen below the limit temperature, the self-holding termination determination section determines that a performance assurance condition is met, and terminates the power self-holding based on at least a fact that the performance assurance condition is met.

DETAILED DESCRIPTION OF THE PREFERRED EMBODIMENTS

Embodiment

Hereinafter, an embodiment of a motor control apparatus will be described with reference to the drawings. The motor control apparatus is used as, for example, a control unit of a steering assist motor in an electric power steering system of a vehicle. Specifically, in the present embodiment, the motor control apparatus is installed in an engine vehicle including an ignition switch.

[Configuration of Motor Control Apparatus]

Figure 1:
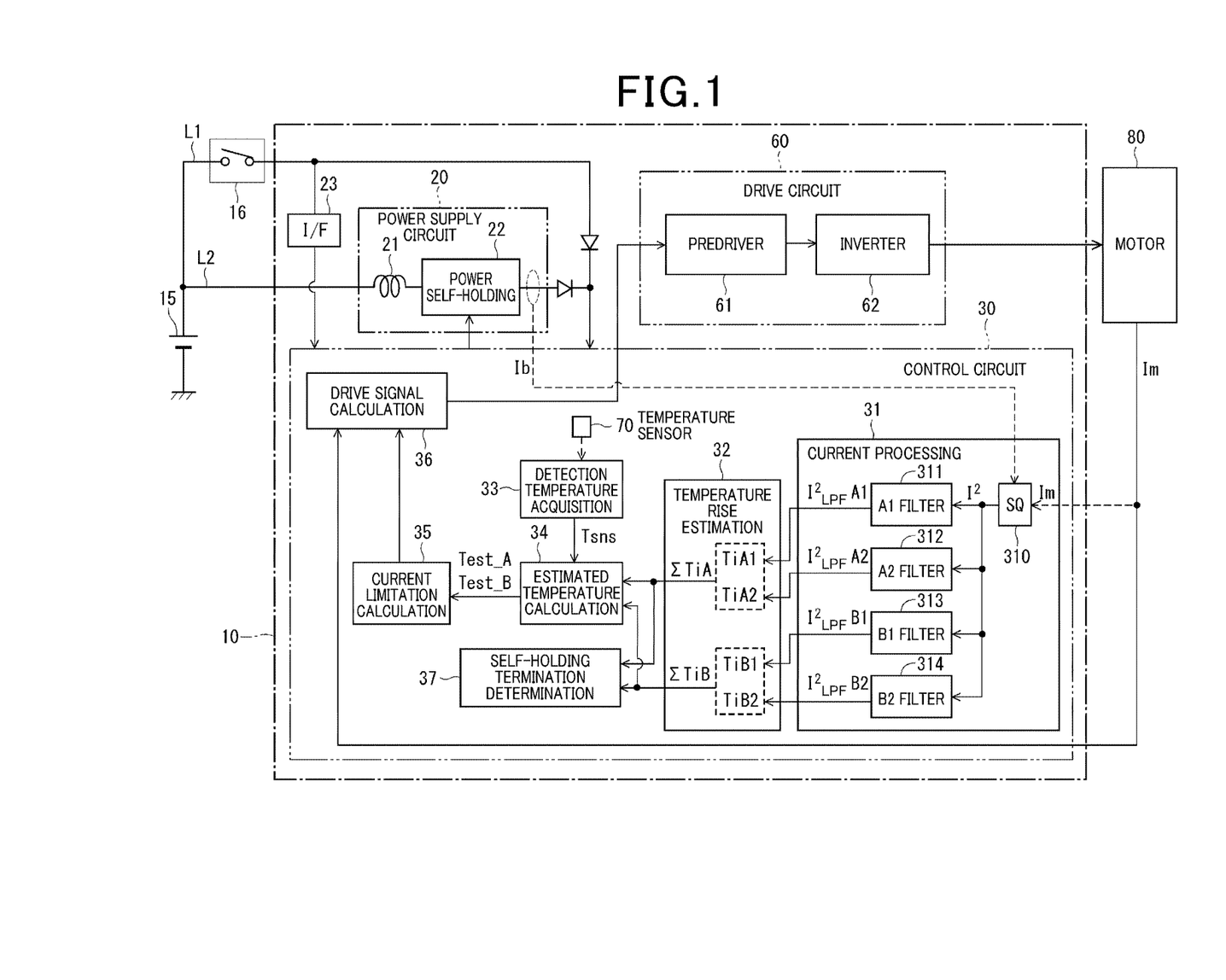
FIG. 1 is a drawing showing the whole configuration of a motor control apparatus according to an embodiment.

First, the configuration of the motor control apparatus will be described with reference to FIG. 1 to FIG. 3. Hereinafter, on/off of an ignition switch (hereinafter, referred to as "IG switch") 16 shown in FIG. 1 is referred to as "IG-ON/OFF". In an IG-ON state, a motor can be driven by being supplied with drive power. In an IG-OFF state, the supply of drive power is stopped.

It is noted that, in the case where the motor control apparatus is installed in a hybrid vehicle or an electric vehicle, "IG-ON/OFF" may be read as "ready ON/OFF".

A motor control apparatus 10 includes a power supply circuit 20, a switch interface (in FIG. 1, "I/F") 23, a control circuit 30, a drive circuit 60, and the like, and operates by electric power supplied from a battery 15.

The electric power is supplied from the battery 15 to the motor control apparatus 10 through electric power lines L1 and L2 connected in parallel. Outside the motor control apparatus 10, the electric power line L1 is provided with the IG switch 16. In addition, inside the motor control apparatus 10, the electric power line L2 is provided with the power supply circuit 20.

The power supply circuit 20 includes a choke coil 21 and a power self-holding section 22. The choke coil 21 removes disturbance noise from the outside, and prevents switching noise generated inside the motor control apparatus 10 from leaking externally. The power self-holding section 22 is configured by a power supply relay, and holds power for control by itself until receiving a cut-off signal from the control circuit 30 after IG-OFF, that is, after the supply of drive power is stopped.

The information of the fact that the IG switch 16 has been turned off is input to the control circuit 30 from the switch interface 23. After IG-OFF, the control circuit 30 holds power by itself (self-holding), and continues temperature estimation calculation described later. Then, if determining to terminate the self-holding (self-holding state), the control circuit 30 outputs a cut-off signal to the power self-holding section 22.

The drive circuit 60 of the motor control apparatus 10 includes a predriver 61 that generates a gate signal, and an inverter 62 that converts DC power of the battery 15 to AC power by switching operation and supplies the AC power to the motor 80. The drive circuit 60 is configured by elements such as a switching element, for example, a MOSFET (metal-oxide semiconductor field-effect transistor), a comparator, a resistor, and a capacitor. The motor 80 is, for example, a three-phase brushless motor.

The control circuit 30 is typically configured by a microcomputer, and generates a command signal for the drive circuit 60 by feedback control of a motor current Im, depending on steering torque. In FIG. 1, a current sensor and a rotation angle sensor are not shown which are used for typical current feedback control and vector control. The motor current Im denotes a current flowing through the motor 80 or the drive circuit 60. In FIG. 1, the motor current Im is shown so as to be input from the motor 80. However, a current output from the drive circuit 60 may be detected and fed back to the control circuit 30.

In addition, the control circuit 30 calculates a temperature rise (the amount of temperature rise) Ti for each protected portion to be protected from being overheated and an estimated temperature Test. Then, the control circuit 30 limits current applied to the motor 80 based on the estimated temperature Test to protect the element from being overheated.

In FIG. 1, for example, a sign "A" is added to an estimated temperature for a portion to be protected of the control circuit 30, and a sign "B" is added to an estimated temperature of a portion to be protected of the inverter 62. Specifically, an IC (integrated circuit) configuring the control circuit 30 and a switching element such as a to MOSFET configuring the inverter 62 are elements to be protected. However, other portions may be protected.

Hereinafter, portions to be protected are not specified and are simply written as "protected portion A", "protected portion B", or the like.

In addition, letters such as A and B are added to the end of signs for temperature rises, estimated temperatures, and the like when corresponding protected portions are required to be distinguished from each other. Otherwise, when the corresponding protected portions are not required to be distinguished from each other and are comprehensively described, the signs are simply written as, for example, "Ti" and "Test".

The control circuit 30 includes a current processing section 31, a temperature rise estimation section 32, a detection temperature acquisition section 33, an estimated temperature calculation section 34, a current limitation calculation section 35, a drive signal calculation section 36, and a self-holding termination determination section 37.

The current processing section 31 and the temperature rise estimation section 32 function during normal driving in an IG-ON state and during power self-holding (power self-holding state) after IG-OFF, The detection temperature acquisition section 33, the estimated temperature calculation section 34, the current limitation calculation section 35, and the drive signal calculation section 36 function mainly during normal driving. The self-holding termination determination section 37 functions mainly during power self-holding.

The current processing section 31 receives a motor current Im flowing through the motor 80 or the drive circuit 60, or a detection value or an estimated value of a power supply current Ib flowing through the power supply circuit 20. When components of the control circuit 30 and the drive circuit 60 are to be protected, the motor current Im is used. When components of the power supply circuit 20 are to be protected, the power supply current Ib is used.

The current processing section 31 has a current square calculation section (in FIG. 1, "SQ") 310 that calculates a square value $I^2$ of an input current, and a plurality of filters 311 to 314 that output a first-order lag response of the current square value $I^2$.

The filters 311 to 314 have time constants different from each other for respective protected portions A and B, and output the first-order lag response of the current square value $I^2$ as a filter value $I^2_{LPF}$. Instead of the current square value, a time average of the integrated value of the current square values may be used. The time constant of each of the filters is determined based on characteristics of the respective protected portions A and B, such as thermal resistance or heat capacity. The time constant of each of the filters is set by, for example, analyzing a response characteristic waveform. It is noted that a filter outputting a current square value or a first-order lag response of a time average of the integrated value of current square values is disclosed in JP-A-2016-92944.

The A1 filter 311 has a first time constant for the protected portion A, and outputs a current square filter value $I^2_{LPF}A1$, The A2 filter 3121 has a second time constant for the protected portion A, and outputs a current square filter value $I^2_{LPF}A2$.

The B1 filter 313 has a first time constant for the protected portion B, and outputs a current square filter value $I^2_{LPF}B1$.

The B2 filter 314 has a second time constant for the protected portion B, and outputs a current square filter value $I^2_{LPF}B2$.

Figure 2:
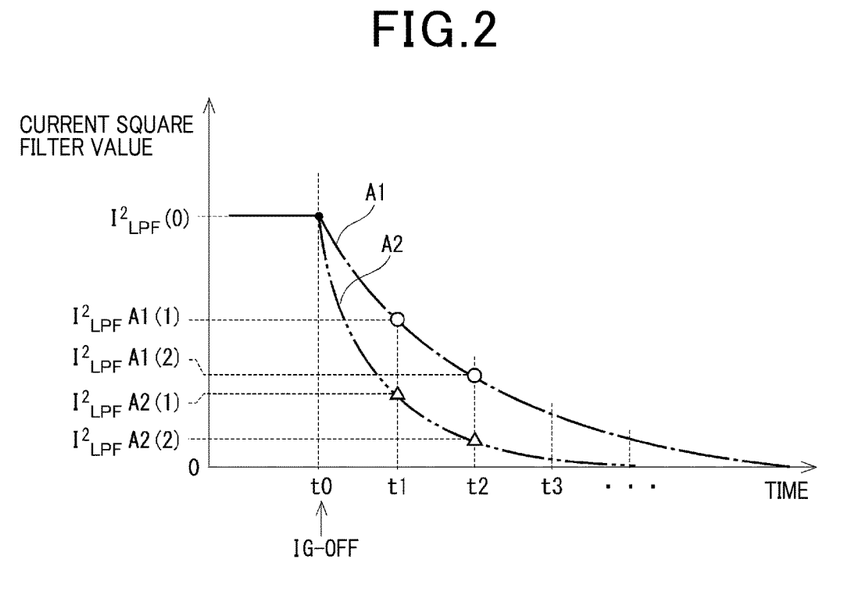
FIG. 2 is a diagram showing variation with time of a current square filter value at IG-OFF time.

FIG. 2 shows variation with time of a current square filter value, where IG-OFF time is time t0. Times t1, t2, t3, . . . are calculation timings at predetermined calculation periods.

$I^2_{LPF}A1(1)$ and $I^2_{LPF}A1(2)$, which are indicated by circles, are filter values output from the A1 filter 311 at times A1 and A2. $I^2_{LPF}A2(1)$ and $I^2_{LPF}A2(2)$, which are indicated by triangles, are filter values output from the A2 filter 312 at times A1 and A2.

The temperature rise estimation section 32 multiplies the current square filter values $I^2_{LPF}A1$, $I^2_{LPF}A2$, $I^2_{LPF}B1$, and $I^2_{LPF}B2$ output from the filters 311 to 314 by a gain K by expression (1) to estimate temperature rises TiA1, TiA2, TiB1, and TiB2, $$Ti = K \times I^2_{LP} \quad (1)$$

The temperature rise estimation section 32 calculates the sums ΣTiA and ΣTiB of the temperature rises for the protected portions A and B by expressions (2.1) and (2.2).

$$\Sigma TiA = TiA1 + TiA2 \quad (2.1)$$

$$\Sigma TiB = TiB1 + TiB2 \quad (2.2)$$

The detection temperature acquisition section 33 acquires a detection temperature Tsns from a temperature sensor 70 such as a thermistor provided to a protected portion to be protected from being overheated or a portion having a correlation regarding temperature with the protected portion. For example, when the control circuit 30 is a protected portion, a temperature of a board on which the elements of the control circuit 30 are mounted may be directly detected. When the inverter 62 is a protected portion, a temperature of the control circuit 30 having a correlation regarding temperature with the inverter 62 may be detected. When the control circuit 30 or the inverter 62 is a protected portion, a temperature corresponding to a heatsink, which is a basis of temperature estimation of the elements on the board, may be detected as a temperature having a correlation with the protected portion.

The estimated temperature calculation section 34 calculates estimated temperatures Test_A and Test_B of the respective protected portions A and B by expressions (3.1) and (3.2) based on the detection temperature Tsns acquired by the detection temperature acquisition section 33 and the sums ΣTiA and ΣTiB of the temperature rises estimated by the temperature rise estimation section 32.

$$Test\_A = Tsns + \Sigma TiA + \delta est\_A \quad (3.1)$$

$$Test\_B = Tsns + \Sigma TiB + \delta est\_B \quad (3.2)$$

Here, the estimation offset temperatures δest_A and δest_B are values for adjusting, for example, the temperature difference between a temperature detection portion and an estimation portion.

The current limitation calculation section 35 calculates a current limiting value for limiting a current command value based on the estimated temperatures Test_A and Test_B. Basically, as the estimated temperatures Test_A and Test_B are higher, the current command value is set to be lower, whereby the protected portions A and B are protected from being overheated.

Figure 3A:
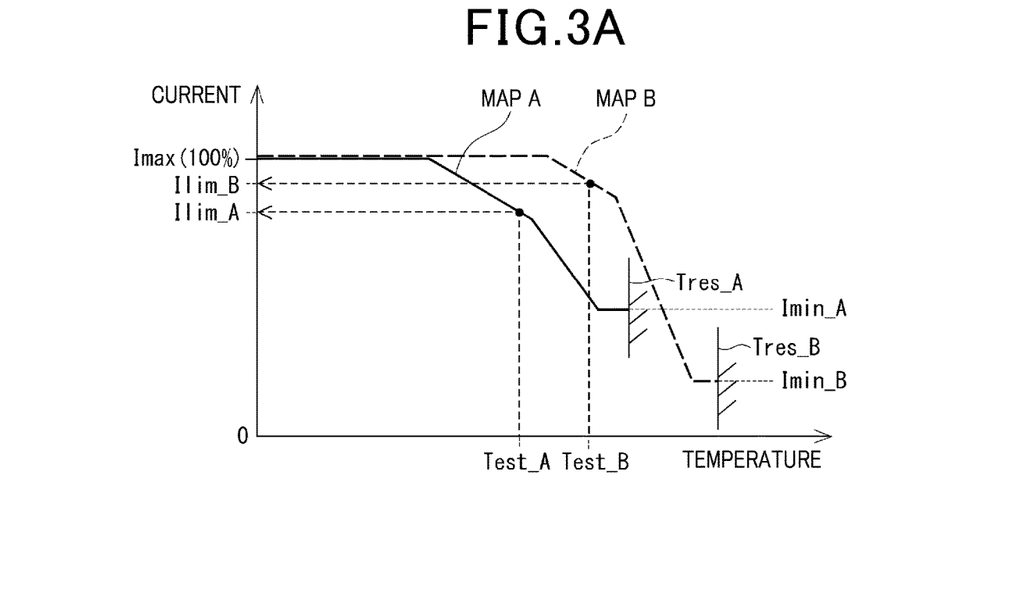
FIG. 3A is an example of an overheat protection map for current limitation.

The current limitation calculation section 35 refers to, for example, an overheat protection map shown in FIG. 3A for limiting current. A map A indicated by a solid line relates to the protected portion A. A map B indicated by a broken line relates to the protected portion B. In a temperature range where a value on the vertical axis is a rated current Imax, a current that is 100% of the rated current Imax can be applied. Hence, 100% of the output performance of the drive circuit 60 and the motor 80 can be exerted.

In contrast, in a temperature range where a value on the vertical axis is lower than the rated current Imax, the current is required to be limited to the current limiting value. The current limiting value gradually lowers from the rated current Imax as the temperature rises, so that the current limiting value reaches to the minimum values Imin_A and Imin_B at heat-resistant temperatures Tres_A and Tres_B for the respective protected portions The current limitation calculation section 35 calculates a current on the vertical axis from the temperature on the horizontal axis of the overheat protection map. That is, the current limitation calculation section 35 calculates current limiting values Ilim_A and Ilim_B corresponding to the estimated temperature Test_A and Test_B, and sets, for example, the minimum value thereof as a current limiting value.

The drive signal calculation section 36 calculates a current command value based on steering torque detected by a steering torque sensor, not shown. The current command value is limited by the current limiting value calculated by the current limitation calculation section 35. The drive signal calculation section 36 generates a voltage command by current feedback control for the current command value after the limitation. Furthermore, the drive signal calculation section 36 generates a PWM signal, which is a drive signal to the drive circuit 60, by, for example, PWM control. The drive circuit 60 operates based on the drive signal, whereby the motor 80 outputs desired assist torque.

The self-holding termination determination section 37 has an overheat protection map that defines the relationship between a current value and maximum temperatures of the protected portions A and B to which the current value can be applied. The overheat protection map is provided in consideration of heat-resistant properties and heating properties for the respective protected portions.

Figure 3B:
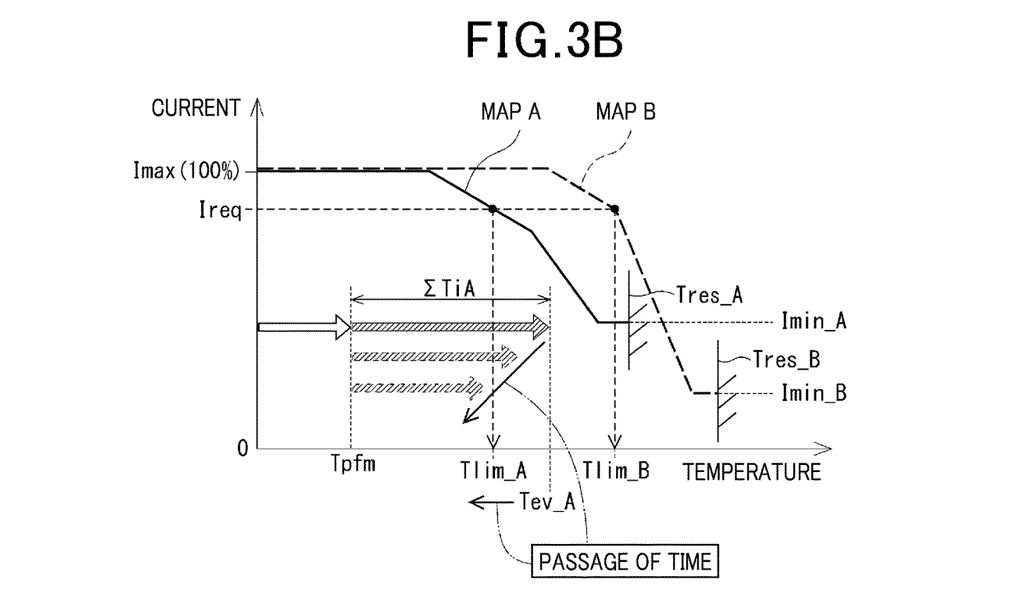
FIG. 3B is an example of an overheat protection map for determining termination of self-holding.

In the present embodiment, an overheat protection map for current limitation shown in FIG. 3A is used in common as a map for determining the termination of self-holding showing in FIG. 3B. It is noted that, in another embodiment, in addition to the map for current limitation, an overheat protection map for exclusively determining the termination of self-holding may be provided. When another map is used, to ensure performance at the next start time, a current value in the map for determining the termination of self-holding is required to be set to be lower than the current limit value at the same temperature in the map for current limitation.

The self-holding termination determination section 37 calculates a temperature on the horizontal axis from a current on the vertical axis of the overheat protection map based on a target value of the current limitation value at the next start time. It is assumed that a current value Ireq required at the next start time is, for example, about 90% of the rated current Imax. The self-holding termination determination section 37 sets limit temperatures Tlim_A and Tlim_B corresponding to the required current value Ireq.

For the protected portion A, the required current value Ireq cannot be ensured at a temperature equal to or higher than the limit temperature Tlim_A. For the protected portion B, the required current value Ireq cannot be ensured at a temperature equal to or higher than the limit temperature Tlim_B.

It is noted that if the required current value Ireq is fixed, and is not changed, the self-holding termination determination section 37 may not refer to the overheat protection map at every IG-OFF time but use the previously stored limit temperatures Tlim_A and Tlim_B at all times. This is also included in cases where the limit temperatures Tlim_A and Tlim_B are set based on the overheat protection map.

In addition, the self-holding termination determination section 37 repeatedly calculates evaluation temperatures Tev_A and Tev_B of the respective protected portions A and B by expressions (4.1) and (4.2) based on the sums ΣTiA and ΣTiB of the temperature rises estimated by the temperature rise estimation section 32, until power self-holding terminates.

$$Tev\_A = Tpfm + \Sigma TiA + \delta\_A \quad (4.1)$$

$$Tev\_B = Tpfm + \Sigma TiB + \delta\_B \quad (3.2)$$

Here, the performance assurance upper limit temperature Tpfm is an upper limit temperature assuring output performance of the motor 80 at the next start time, and is set based on, for example, the amount of electric conduction required for generating torque at the initial start time. Specifically, in the electric power steering system, the performance assurance upper limit temperature Tpf is set from the viewpoint of ensuring an initial assist rate at the next start time, that is, a contribution ratio of assist torque to steering torque.

In addition, the performance offset values δ_A and δ_B are values for adjusting characteristic differences between the protected portions with reference to the performance assurance upper limit temperature Tpfm. It is noted that, in FIG. 3B, the performance offset values δ_A and δ_B are not shown.

Furthermore, a process for comparing the evaluation temperature and the limit temperature for each protected portion is defined as a next time performance determination process. In addition, in the next time performance determination process, if the evaluation temperatures for all the protected portions are lower than the limit temperatures, that is, both the expressions (5.1) and (5.2) are met, it is determined that a performance assurance condition is met.

$$Tev\_A < Tlim\_A \quad (5.1)$$

$$Tev\_B < Tlim\_B \quad (5.2)$$

FIG. 3B shows an example of temperature regarding the protected portion A. Since the sum TiA of temperature rises is relatively high immediately after IG-OFF, the evaluation temperature Tev_A becomes higher than the limit temperature Tlim_A, whereby the performance assurance condition is not met. However, during power self-holding, the sum ΣTiA of temperature rises gradually decreases as time passes from IG-OFF, and the evaluation temperature Tev_A, which is a sum, also gradually lowers. Then, at a certain time point, the evaluation temperature Tev_A falls below the limit temperature Tlim_A.

Similarly, the temperature of the protected portion B also lowers as time passes from IG-OFF. If the evaluation temperature Tev_A falls below the limit temperature Tlim_A, and the evaluation temperature Tev_B falls below the limit temperature Tlim_B, the performance assurance condition is met.

[Operation of Motor Control Apparatus]

Next, operation of the motor control apparatus 10 of the present embodiment will be described with reference to flowcharts in FIG. 4, FIG. 5, and FIG. 6, self-holding addition time maps in FIGS. 7A and 7B, and a time diagram in FIG. 8. In the following descriptions of the flowcharts, sign S denotes "step".

Figure 4:
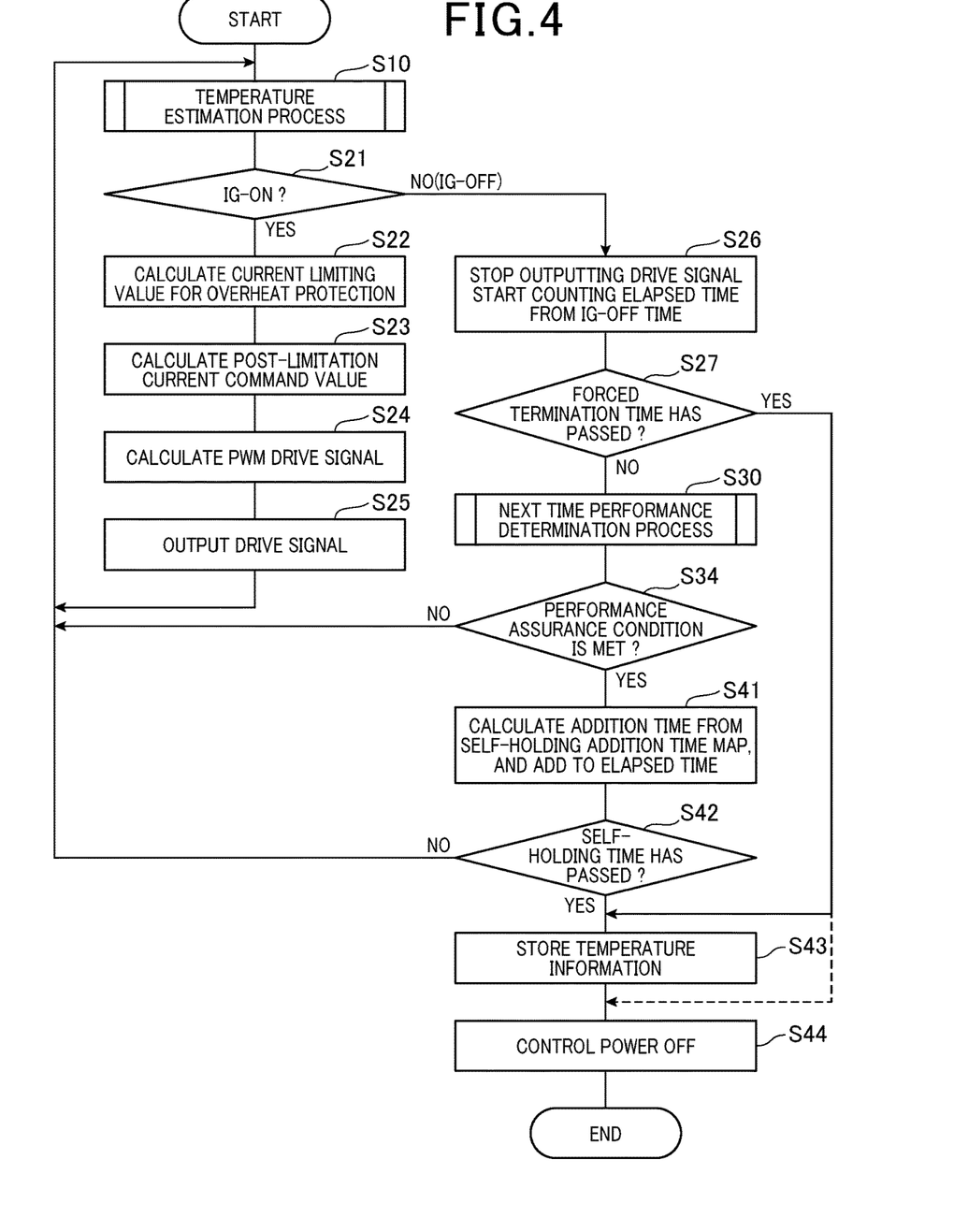
FIG. 4 is a main flowchart of operation of the motor control apparatus according to the embodiment.
Figure 5:
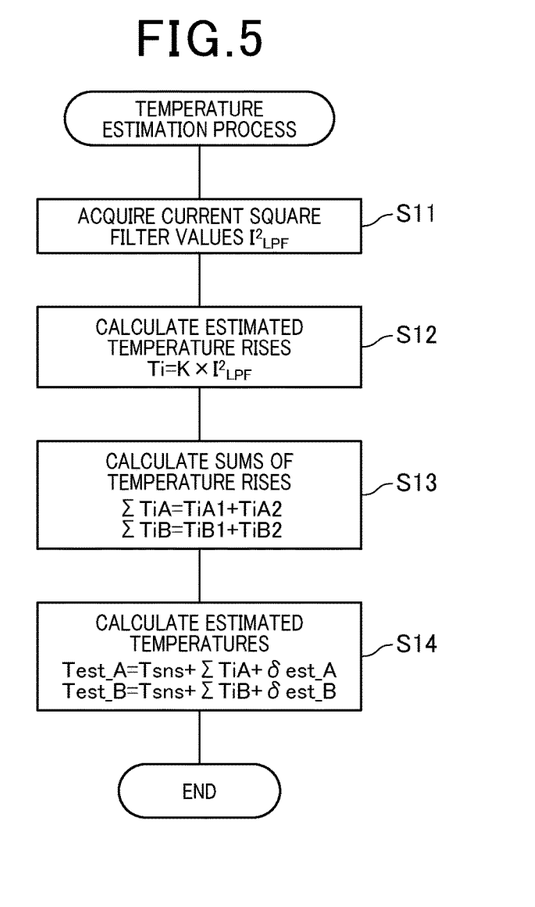
FIG. 5 is a sub-flowchart of a temperature estimation process.
Figure 6:
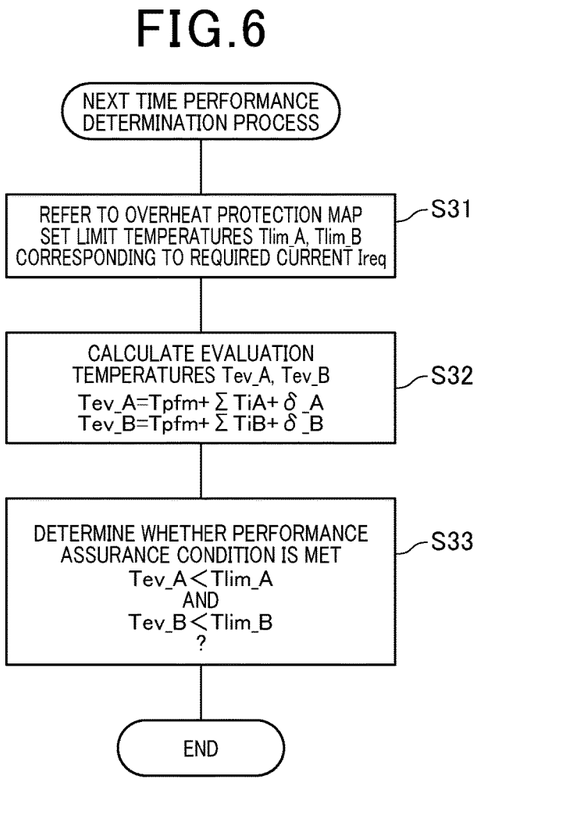
FIG. 6 is a sub-flowchart of a next time performance determination process.

S10 in FIG. 4 is a temperature estimation process whose details are indicated in a sub-flowchart in FIG. 5. In S11 and S12 in FIG. 5, signs corresponding to the filters are omitted.

In S11, the temperature rise estimation section 32 acquires the current square filter values $I^2_{LPF}A1$, $I^2_{LPF}A2$, $I^2_{LPF}B1$, and $I^2_{LPF}B2$ output from the filters 311 to 314.

In S12, the temperature rise estimation section 32 calculates the temperature rises TiA1, TiA2, TiB1, and TiB2 by expression (1). In addition, in S13, the temperature rise estimation section 32 calculates the sums ΣTiA and ΣTi B of temperature rises by expressions (2.1) and (2.2).

In S14, the estimated temperature calculation section 34 calculates the estimated temperature Test_A and Test_B by expressions (3.1) and (3.2).

Next, in S21 in FIG. 4, it is determined whether it is in an IG-ON state at the present time, that is, whether or not normal driving is being performed.

In a case of IG-ON, a positive determination (YES) is made in S21, and the process proceeds to S22 to S25, which are performed during normal driving.

In S22, the current limitation calculation section 35 calculates a current limiting value for overheat protection.

Based on the current limiting value, in S23, the drive signal calculation section 36 calculates a post-limitation current command value.

Next, the drive signal calculation section 36 calculates a PWM drive signal in S24, and outputs the drive signal to the predriver 61 of the drive circuit 60 in S25.

In a case of IG-OFF, a negative determination (NO) is made in S21, and in S26, the drive signal calculation section 36 stops outputting the drive signal. In addition, counting elapsed time from IG-OFF time is started.

Succeeding steps S27 to S42 are performed by the self-holding termination determination section 37.

In S27, it is determined whether or not forced termination time has passed at the present time. The forced termination time is set as a sufficient time period for cooling the protected portion even when the temperature rise Ti is large.

If the forced termination time has passed, a positive determination (YES) is made in S27, and the process proceeds to S43. Alternatively, as indicated by a broken line, the process may skip S43 and proceed to S43.

If the forced termination time has not passed, a negative determination (NO) is made in S27, and the process proceeds to the next time performance determination process of S30.

The next time performance determination process in S30 will be described in detail with reference to the sub-flowchart in FIG. 6.

In S31, the self-holding termination determination section 37 refers to the overheat protection maps A and B to set the limit temperatures Tlim_A and Tlim_B corresponding to the required current value Ireq at the next start time.

In S32, the self-holding termination determination section 37 calculates the evaluation temperatures Tev_A and Tev_B by expressions (4.1) and (4.2).

In S33, the self-holding termination determination section 37 determines whether or not the evaluation temperatures Tev of all the protected portions have fallen below the limit temperatures Tlim to meet the performance assurance condition, that is, whether or not expressions (5.1) and (5.2) are met.

Returning to FIG. 4, as a result of the determination in S33, if the performance assurance condition is met, a positive determination (YES) is made in S34, and the process proceeds to S41. In contrast, if the performance assurance condition is not met, a negative determination (NO) is made in S34, and the process returns to S10, in which the temperature estimation is continued.

In S41, the self-holding termination determination section 37 calculates an addition time from the self-holding addition time map, and adds the calculated addition time to the elapsed time from IG-OFF time to the present time. That is, the time obtained by adding the addition time to the elapsed time at the present time is self-holding time from IG-OFF time.

In S42, it is determined whether or not the self-holding time has passed at the present time.

If the self-holding time has passed, a positive determination (YES) is made in S42, and the process proceeds to S43.

If the self-holding time has not passed, a negative determination (NO) is made in S42, and the process returns to S10, in which the temperature estimation is continued. That is, until the self-holding time passes, the loop "S42: NO→S10→S21:NO→S26 to S41" is repeated.

Figure 7A:
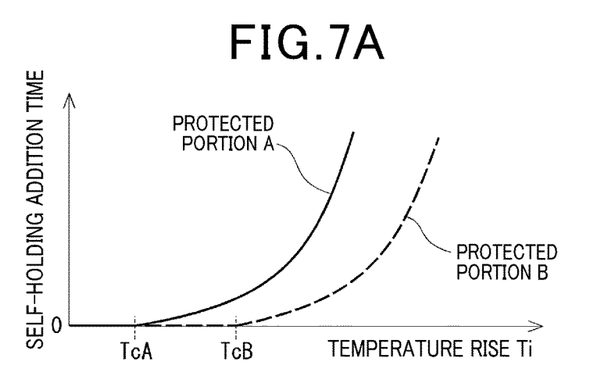
FIG. 7A is an example of a self-holding addition time map
Figure 7B:
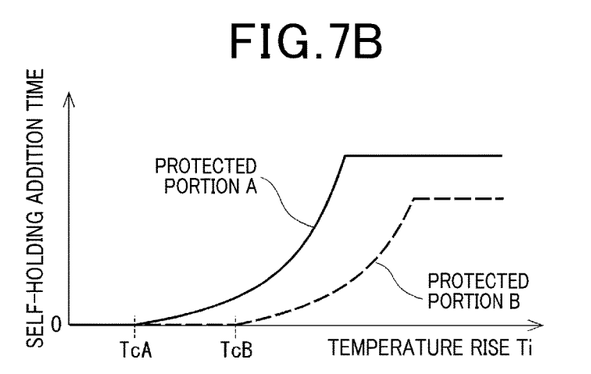
FIG. 7B is an example of the self-holding addition time map.

As shown in FIGS. 7A and 7B, the self-holding addition time map defines the relationship between the temperature rise and the io self-holding addition time for each protected portion. Here, the temperature rise Ti on the horizontal axis may appropriately be the following values.

(1) temperature rises TA1, TA2, TB1, and TB2 for the respective protected portions, which are obtained for the respective filters (2) sums $\Sigma TiA$ and $\Sigma TiB$ of the temperature rises for the respective protected portions (3) maximum values of the temperature rises for the respective protected portions, which are obtained for the respective filters

: MAX(TA1, TA2), MAX(TB1, TB2)

(4) a maximum value of the temperature rises for the all protected portions, which are obtained for the respective filters

: MAX(TA1, TA2, TB1, TB2)

In addition, the self-holding addition time map is set based on, for example, the time period during which a certain electric conduction pattern can be maintained at the next start time or the number of electric conduction patterns that can be repeated. Specifically, in the electric power steering system, from the viewpoint of ensuring the number of stationary steering operations at the next start time, the self-holding addition time map is set.

In FIGS. 7A and 7B, in the case of the protected portion A, as the temperature rise TiA lowers, the self-holding addition time shortens. If the temperature rise TiA is a critical temperature TcA or less, the self-holding addition time is 0. Similarly, in the case of the protected portion B, as the temperature rise TiB lowers, the self-holding addition time shortens. If the temperature rise TiB is a critical temperature TcB or less, the self-holding addition time is 0.

The pattern of the self-holding addition time map may be appropriately set in detail. In the example shown in FIG. 7A, the self-holding addition time increases with the increase of the temperature rise Ti. In contrast, in the example shown in FIG. 7B, in the range where the temperature rise Ti is a predetermined value or more, an upper limit value is set so that the self-holding addition time becomes saturated. Alternatively, in the map, conditions for satisfying various kinds of performance at the next start time may be combined.

While the temperature estimation loop is repeated, the temperature rises TiA and TiB gradually decrease with the passage of time from IG-OFF time. Hence, the self-holding addition time also gradually shortens. Then, when the temperature rises TiA and TiB lower to the critical temperatures TcA and TcB, the self-holding addition time is 0.

Figure 8:
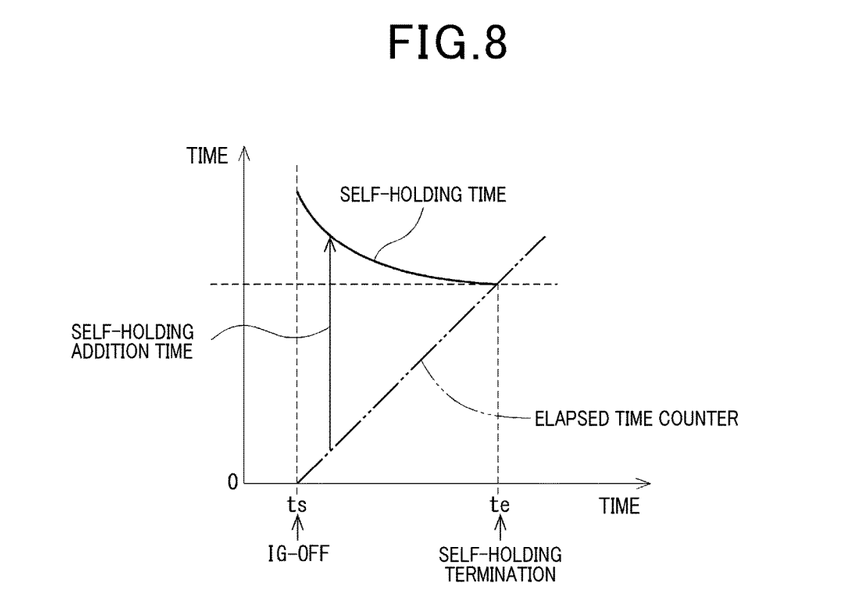
FIG. 8 is a time diagram showing self-holding operation.

The above operation is shown in the time diagram in FIG. 8. In FIG. 8, time ts on the horizontal axis indicates IG-OFF time, and time te indicates the self-holding termination timing. After time ts, as the elapsed time increases, the self-holding addition time gradually shortens. Then, if the self-holding time agrees with the elapsed time at time te, a positive determination (YES) is made in S42, that is, it is determined that the self-holding time has passed.

If a positive determination (YES) is made in S42, the control circuit 30 stores temperature information in a nonvolatile memory or the like in S43, and thereafter shuts off control power in S44. Thus, the power self-holding terminates. It is noted that the timing when the temperature information is stored may be the time when the power self-holding terminates or may be at calculation periods.

The temperature information stored in S43 is read at the next start time. Then, initial current limitation is performed based on the temperature information. At this time, the required current value Ireq of the overheat protection map should be ensured.

In S27, if the forced termination time has passed to terminates power self-holding, the current limiting value may be calculated based on sufficiently low temperature at the next start time. Hence, as shown in the broken line, the temperature information storing step in S43 may not be performed.

The description of the operation of the motor control apparatus 10 ends.

A situation is assumed in which the motor 80 is not driven before IG-OFF, and the temperature rise Ti is extremely small. In this situation, the case where the performance assurance condition is met in the next time performance determination process immediately after IG-OFF time, or the case where the temperature rise Ti immediately after IG-OFF time is the critical temperature TcA of the self-holding addition time map or less is assumed. In these cases, in the flowchart in FIG. 4, if positive determinations (YES) are made in both S34 and S42 in the first round, power self-holding can terminate without undergoing the loop of the temperature estimation process in S10.

However, in such a case, problems to be solved by the present embodiment are not present in the first place. Hence, the technical significance of the present embodiment is considered, virtually assuming a situation in which if a certain temperature rise Ti has occurred at IG-OFF time, and after the temperature estimation loop is repeated at least several times in the flowchart on FIG. 4, power self-holding is terminated.

(Effects)

Effects of the motor control apparatus 10 according to the present embodiment will be described.

(1) Japanese Patent No. 2892899 discloses a technique in which control power is subjected to self-holding after IG-OFF to continue temperature estimation. In the technique, when self-holding time calculated based on a temperature rise of a motor has passed, power self-holding terminates.

According to this technique, to ensure required performance at the next start time, an allowable temperature value has to be low, and a holding time has to be longer. Hence, dark current increases while the motor is stopped.

In contrast, the self-holding termination determination section 37 of the present embodiment performs the next time performance determination process, in which, during power self-holding, the evaluation temperature Tev_A calculated from the performance assurance upper limit temperature Tpfm and the sum ΣTi of the temperature rises are compared with the limit temperatures Tlim set based on the overheat protection map. Then, if the evaluation temperatures Tev for all the protected portions are lower than the limit temperatures Tlim, it is determined that a performance assurance condition is met, and completes the power self-holding based on the fact that at least the performance assurance condition is met.

The paragraph [0006] in Japanese Patent No. 2892899 describes a technique in which power is subjected to self-holding until the temperature rise of the motor falls below an allowable value. It can be considered that the temperature rise corresponds to the estimated temperature Test used for temperature control such as current limiting value calculation during normal driving.

However, the evaluation temperature Tev_A used for determining the termination of self-holding of the present embodiment is completely different from the estimated temperature Test used for temperature control during normal driving. That is, the evaluation temperature Tev_A is an index value indicating for exclusively determining the termination of self-holding with reference to the performance assurance upper limit temperature Tpfm set with the point of view of ensuring output performance of the motor at the next start time.

In addition, the limit temperature Tlim is set based on the overheat protection map provided in consideration of heat-resistant properties and heating properties for the respective protected portions, and differs from a predetermined temperature simply and uniformly set.

According to the present embodiment, the termination of the power self-holding is determined by the next time performance determination process for comparing the evaluation temperature Tev and the limit temperature Tlim set as described above. Hence, while the required performance at the next start time is ensured, the power self-holding time can be minimized. Hence, dark current can be prevented from increasing by setting the self-holding time to be no longer than necessary, whereby the consumption of the battery 15 can be reduced.

(2) When predetermined forced termination time has passed from IG-OFF time, the self-holding termination determination section 37 forcibly terminates the power self-holding. For example, when the limit temperature Tlim based on the overheat protection map is relatively low, the time period until the performance assurance condition is met becomes long. When the temperature rise Ti is relatively large, the self-holding addition time map becomes long. In these cases, since the termination of the self-holding is delayed, dark current increases. Hence, the maximum amount of time required for cooling the protected portion is set as the forced termination time. Thereby, even when the performance assurance condition is met late, while overheat protection can be ensured, dark current can be reduced.

(3) When it is determined that the performance assurance condition is met in the next time performance determination process, the self-holding termination determination section 37 terminates the power self-holding when the self-holding time has passed which is obtained by adding the self-holding addition time to the elapsed time from IG-OFF time. Hence, the self-holding terminates after the temperature of the overheat protection has been lowered to the level at which next time performance can be ensured. Thereby, even if restarting immediately after the termination of the self-holding, output performance of the motor 80 can be ensured.

(4) The control circuit 30 stores temperature information at the time of termination of the power self-holding, and performs initial current limitation based on the temperature information at the next start time. Hence, the required current value Ireq can be ensured when current is limited at the next start time.

Other Embodiments (a) In the above embodiment, two portions A and B are assumed as the protected portions. In addition, for the protected portions A and B, a plurality of temperature rises TA1, TA2, TB1, and TB2 are estimated based on filter values of a plurality of filters A1, A2, B1, and B2. However, one protected portion may be provided. In addition, for the protected portions, one temperature rise may be estimated based on one filter value. In this case, the sum of temperature rises of the present embodiment may be interpreted as a value of one temperature rise.

(b) In the operation example shown in the flowchart in FIG. 4, the power self-holding forcibly terminates even if the performance assurance condition is not met when the forced termination time has passed. However, for example, if the limit temperature Tlim based on the overheat protection map is sufficiently high, whereby the performance assurance condition is reliably met immediately after IG-OFF, and if the self-holding addition time corresponding to the assumed maximum temperature rise Ti is relatively short, the forced termination time may not be set.

(c) The motor control apparatus may control electric conduction from drive circuits of a plurality of systems to a plurality of sets of windings of a motor. In this case, the protected portions may be set for the respective systems or for all the systems in common. The temperature rise Ti may be estimated based on the current square values for respective systems or the maximum value of the current square values of the systems.

In addition, the motor control apparatus and the motor may be integrated to configure a so-called mechanically and electrically integrated type. Furthermore, the drive circuit of the motor control apparatus and the motor to be driven are not limited to the inverter and the three-phase brushless motor exemplified in the above embodiments, but may be, for example, an H bridge circuit and a DC motor.

(d) The motor control apparatus may drive not only a steering assist motor in an electric power steering system but also any motor. Specifically, the motor control apparatus is effective for a motor requiring relatively high performance assurance specifically at the next start time.

It will be appreciated that the present invention is not limited to the configurations described above, but any and all modifications, variations or equivalents, which may occur to those who are skilled in the art, should be considered to fall within the scope of the present invention.

Hereinafter, an aspect of the above-described embodiments will be summarized.

As an aspect of the embodiment, a motor control apparatus is provided which includes a drive circuit (60) that drives a motor (80), a power supply circuit (20) that has a power self-holding section (22), a temperature rise estimation section (32), a detection temperature acquisition section (33), an estimated temperature calculation section (34), a current limitation calculation section (35), and a self-holding termination determination section (37).

The power self-holding section of the power supply circuit holds power by itself for control after supply of drive power to the drive circuit is stopped.

The temperature rise estimation section estimates at least one temperature rise (TiA1, TiA2, TiB1, TiB2) based on a square value of current flowing through the motor, the drive circuit, or the power supply circuit, or a first-order lag response of a time average of an integrated value of the current.

The detection temperature acquisition section acquires a detection temperature (Tsns) of at least one protected portion to be protected from being overheated or of a portion having a correlation regarding temperature with the protected portion.

The estimated temperature calculation section adds the detection temperature to a sum ($\Sigma TiA$, $\Sigma TiB$) of the at least one temperature rise to calculate estimated temperature (Test_A, Test_B) of the protected portion. It is noted that estimated temperature may be calculated by appropriately adding estimation offset temperature to the obtained estimated temperature.

The current limitation calculation section calculates a current limiting value for limiting a current command value based on the estimated temperature.

The self-holding termination determination section determines termination of power self-holding The temperature rise estimation section continues the estimation of the temperature rise while the power self-holding section holds power by itself.

The self-holding termination determination section has an overheat protection map that defines a relationship between a current value and a maximum temperature of the protected portion to which the current value is applied, and sets a limit temperature (Tlim_A, Tlim_B) corresponding to a required current value (Ireq) at next start time based on the overheat protection map.

In addition, the self-holding termination determination section calculates, as an evaluation temperature (Tev_A, Tev_B), a temperature obtained by adding a performance assurance upper limit temperature (Tpfm), which is an upper limit temperature assuring output performance of the motor at the next start time, to a sum of the at least one temperature rise. It is noted that the evaluation temperature may be calculated by appropriately adding performance offset temperature to the obtained evaluation temperature.

In addition, in a next time performance determination process for comparing the evaluation temperature and the limit temperature, if the evaluation temperature for all of the at least one protected portion has fallen below the limit temperature, the self-holding termination determination section determines that a performance assurance condition is met. Then, the self-holding termination determination section terminates the power self-holding based on at least the fact that the performance assurance condition is met.

It is noted that "based on at least the fact that the performance assurance condition is met" means that although meeting the performance assurance condition is one condition for opposing the termination of the self-holding, it is not necessarily the sufficient condition for the termination of the self-holding.

The evaluation temperature used for determining the termination of self-holding of the present embodiment is different from the estimated temperature used for temperature control during normal driving. That is, the evaluation temperature is an index value indicating for exclusively determining the termination of self-holding with reference to the performance assurance upper limit temperature set with the point of view of ensuring output performance of the motor at the next start time. In addition, the limit temperature is set based on the overheat protection map provided for the respective protected portions.

According to the present embodiment, the termination of the power self-holding is determined by the next time performance determination process for comparing the evaluation temperature and the limit temperature set as described above. Hence, while the required performance at the next start time is ensured, the power self-holding time can be minimized. Hence, dark current can be prevented from increasing by setting the self-holding time to be no longer than necessary, whereby the consumption of the battery can be reduced.

In addition, when predetermined forced termination time has passed from the time when the supply of drive power is stopped, it is preferable that the self-holding termination determination section forcibly terminates the power self-holding. The maximum amount of time required for cooling the protected portion is set as the forced termination time. Thereby, even when the performance assurance condition is met late, while overheat protection can be ensured, dark current can be reduced.

What is claimed is:

1. A motor control apparatus, comprising:
a drive circuit that drives a motor;
a power supply circuit that has a power self-holding section that holds power for control after supply of drive power to the drive circuit is stopped;
a temperature rise estimation section that estimates at least one temperature rise based on a square value of current flowing through the motor, the drive circuit, or the power supply circuit, or a first-order lag response of a time average of an integrated value of the current;
a detection temperature acquisition section that acquires a detection temperature of at least one protected portion to be protected from being overheated or of a portion having a correlation regarding temperature with the protected portion;
an estimated temperature calculation section that adds the detection temperature to a sum of the at least one temperature rise to calculate estimated temperature of the protected portion;
a current limitation calculation section that calculates a current limiting value for limiting a current command value based on the estimated temperature; and
a self-holding termination determination section that determines termination of power self-holding, wherein
the temperature rise estimation section continues the estimation of the temperature rise while the power self-holding section holds power,
the self-holding termination determination section has an overheat protection map that defines a relationship between a current value and a maximum temperature of the protected portion to which the current value is applied, and sets a limit temperature corresponding to a required current value at next start time based on the overheat protection map,
the self-holding termination determination section calculates, as an evaluation temperature, temperature obtained by adding a performance assurance upper limit temperature, which is an upper limit temperature assuring output performance of the motor at the next start time, to a sum of the at least one temperature rise, and in a next time performance determination process for comparing the evaluation temperature and the limit temperature, if the evaluation temperature for all of the at least one protected portion has fallen below the limit temperature, the self-holding termination determination section determines that a performance assurance condition is met, and terminates the power self-holding based on at least a fact that the performance assurance condition is met.

2. The motor control apparatus according to claim 1, wherein when a predetermined forced termination time has passed from time when the supply of drive power is stopped, the self-holding termination determination section forcibly terminates the power self-holding.

3. The motor control apparatus according to claim 1, wherein the self-holding termination determination section has a self-holding addition time map that defines a relationship between the temperature rise and a self-holding addition time, which is added to an elapsed time from the time when the supply of drive power is stopped, to obtain a sum as a self-holding time, and if it is determined that the performance assurance condition is met in the next time performance determination process, the self-holding termination determination section terminates the power self-holding when the self-holding time based on the self-holding addition time map has passed.

4. The motor control apparatus according to claim 3, wherein in the self-holding addition time map, the self-holding addition time is set so as to be shorter as the temperature rise lowers, and to be 0 if the temperature rise is a critical temperature or less.

5. The motor control apparatus according to claim 1, wherein temperature information is stored when the power self-holding terminates, and initial current limitation is performed based on the temperature information at the next start time.

* * * * *